(12) United States Patent
Liu et al.

(10) Patent No.: US 11,020,781 B2
(45) Date of Patent: Jun. 1, 2021

(54) METAL WIRES, MANUFACTURING METHODS THEREFOR AND TIRES

(71) Applicant: Jiangsu Xingda Steel Tyre Cord Co., Ltd., Jiangsu (CN)

(72) Inventors: Xiang Liu, Jiangsu (CN); Ziming Hu, Jiangsu (CN); Haidong Yao, Jiangsu (CN)

(73) Assignee: Jiangsu Xingda Steel Tyre Cord Co., Ltd.

( * ) Notice: Subject to any disclaimer, the term of this patent is extended or adjusted under 35 U.S.C. 154(b) by 141 days.

(21) Appl. No.: 16/462,257

(22) PCT Filed: Oct. 25, 2017

(86) PCT No.: PCT/CN2017/107593
§ 371 (c)(1),
(2) Date: May 20, 2019

(87) PCT Pub. No.: WO2019/079990
PCT Pub. Date: May 2, 2019

(65) Prior Publication Data
US 2019/0338435 A1    Nov. 7, 2019

(30) Foreign Application Priority Data
Oct. 23, 2017 (CN) .......................... 201710990283.2

(51) Int. Cl.
*B21C 37/04* (2006.01)
*B60C 9/00* (2006.01)
(Continued)

(52) U.S. Cl.
CPC ............ *B21C 37/042* (2013.01); *B29B 15/08* (2013.01); *B60C 9/0007* (2013.01); *C21D 8/065* (2013.01);
(Continued)

(58) Field of Classification Search
CPC ..... B21C 37/042; B29B 15/08; B60C 9/0007; B60C 2009/0014; C21D 8/065;
(Continued)

(56) References Cited

U.S. PATENT DOCUMENTS 4,683,175 A * 7/1987 Bakewell ................. C21D 8/06
148/532
2008/0066843 A1 * 3/2008 Alvarez ................. D07B 1/062
152/451

(Continued)

*Primary Examiner* — Shaun R Hurley

(57) ABSTRACT

Disclosed are a metal wire, a manufacturing method therefor, and a tire. The metal wire is made by twisting a filament; an outer peripheral surface of the filament is covered with a Cu-M-Zn alloy coating; the outer peripheral surface of the filament is also covered with a Cu—Zn alloy coating; the metal wire is made of at least one filament; an area covered by the Cu-M-Zn alloy coating is 10%-90% of an area of the outer peripheral surface of the filament, and the rest is the Cu—Zn alloy coating; M in the Cu-M-Zn alloy coating is selected from one or two of Co, Ni, Mn, or Mo; the mass fraction of Cu in the Cu-M-Zn alloy coating is 58%-72%, the mass fraction of M in the Cu-M-Zn alloy coating is 0.5%-5%, and the balance in the Cu-M-Zn alloy coating is Zn and inevitable impurities.

11 Claims, 2 Drawing Sheets

(51) Int. Cl.
  *B29B 15/08* (2006.01)
  *C21D 8/06* (2006.01)
  *C21D 9/52* (2006.01)
  *C22C 9/04* (2006.01)
  *C23F 17/00* (2006.01)
  *C25D 3/58* (2006.01)
  *C25D 5/12* (2006.01)
  *C25D 5/50* (2006.01)
  *C25D 7/06* (2006.01)
  *D07B 1/06* (2006.01)

(52) U.S. Cl.
  CPC ............... *C21D 9/525* (2013.01); *C22C 9/04* (2013.01); *C23F 17/00* (2013.01); *C25D 3/58* (2013.01); *C25D 5/12* (2013.01); *C25D 5/50* (2013.01); *C25D 7/0607* (2013.01); *D07B 1/0693* (2013.01); *B60C 2009/0014* (2013.01); *D07B 2501/2046* (2013.01)

(58) Field of Classification Search
  CPC ........... C21D 9/525; C22C 9/04; C23F 17/00; C25D 3/58; C25D 5/12; C25D 5/50; C25D 7/0607; D07B 1/0693; D07B 2501/2046
  See application file for complete search history.

(56) References Cited

U.S. PATENT DOCUMENTS

| | | | |
|---|---|---|---|
| 2015/0246581 A1* | 9/2015 | Salgues | B60C 15/00 524/575 |
| 2016/0280009 A1* | 9/2016 | Verleene | C22C 38/04 |
| 2018/0266000 A1* | 9/2018 | Nakajima | B60C 9/0007 |
| 2019/0255884 A1* | 8/2019 | Barbouteau | C08K 3/04 |

\* cited by examiner ated aging and crack growth of rubber. Furthermore, Co is also a strategic material and the price is quite high, which leads to a significant increase in the production cost of metal wires and tires.

METAL WIRES, MANUFACTURING METHODS THEREFOR AND TIRES

FIELD

The present invention relates to the technical field of rubber products, and in particular, to metal wires, manufacturing methods therefor, and tires.

BACKGROUND

Metal wires containing brass-coated filaments are widely applied to reinforced rubber products, such as tires, conveyer belts, and hydraulic tubing. For good adhesion and reduced adhesion degradation rates, Co complexes are added in rubber compounds, especially for aging under damp heat conditions.

In the prior art, brass coatings are replaced by Cu—Co—Zn ternary alloy coatings so as to ensure the damp heat aging adhesion between the metal wires and Co-free rubber and enable rubber materials to have good durability. For example, the invention patent with an application No. CN201280043391.4 entitled "METAL WIRES FOR RUBBER REINFORCEMENT, MANUFACTURING METHODS THEREFOR, AND TIRES" recites the technical content of adding a specific amount of Cu in a coating to improve the drawing processability of a metal wire and adding a specific amount of Co to improve the adhesiveness between the metal wire and a rubber composition. However, Co is an oxidizing substance, which will accelerate aging and crack growth of rubber. Furthermore, Co is also a strategic material and the price is quite high, which leads to a significant increase in the production cost of metal wires and tires.

The invention patent with an application No. CN201380039181.2 entitled "STEEL CORD FOR RUBBER REINFORCEMENT WITH SELECTIVELY BRASS COATED FILAMENTS" recites the technical content of manufacturing a metal wire by a filament covered with a Cu-M-Zn ternary or quaternary alloy coating to reduce the amount of Co and ensure good adhesion. Co in the Cu—Co—Zn ternary alloy coating will inhibit the diffusion of Zn and prevent the loss of Zn, thereby improving the damp heat aging adhesion. However, the diffusion of Zn at an initial stage will also be inhibited, which will cause reduced initial adhesion between the metal wire made of the filament covered with the Cu—Co—Zn ternary alloy coating and the rubber.

Hence, until now, there has not been found a method capable of making the metal wire good in both initial adhesion and damp heat aging adhesion.

SUMMARY

The present invention aims at overcoming deficiencies in the prior art by providing a metal wire, a manufacturing method therefor, and a tire, where the metal wire is good in both initial adhesion and damp heat aging adhesion.

In order to solve problems in the prior art, the present invention discloses a metal wire, made by twisting a filament, an outer peripheral surface of the filament being covered with a Cu-M-Zn alloy coating, where the outer peripheral surface of the filament is also covered with a Cu—Zn alloy coating; the metal wire is made of at least one filament; an area covered by the Cu-M-Zn alloy coating is 10%-90% of an area of the outer peripheral surface of the filament, and the rest is the Cu—Zn alloy coating; M in the Cu-M-Zn alloy coating is selected from one or two of Co, Ni, Mn, or Mo; and the mass fraction of Cu in the Cu-M-Zn alloy coating is 58%-72%, the mass fraction of M in the Cu-M-Zn alloy coating is 0.5%-5%, and the balance in the Cu-M-Zn alloy coating is Zn and inevitable impurities.

As a preferred solution, the area covered by the Cu-M-Zn alloy coating is 40%-60% of the area of the outer peripheral surface of the filament.

As a preferred solution, the diameter of the filament is 0.10-0.80 mm.

The present invention also discloses a manufacturing method for said metal wire, comprising:
S1. pretreating a steel wire;
S2. immersing the steel wire obtained in S1 into solutions to respectively electroplate Cu, Zn, and M thereon;
S3. thermally treating the steel wire obtained in S2 to obtain a Cu-M-Zn alloy coating and a Cu—Zn alloy coating by means of thermal diffusion;
S4. drawing the steel wire obtained in S3 into a filament; and
S5. twisting at least one filament obtained in S4 to obtain said metal wire;
where in S2, M electroplating is performed by immersing a part of the steel wire into an M-containing solution, where the solution contains 30-50 g/l M and an immersion depth of the steel wire in the solution is 5%-95% of the diameter of the steel wire.

As a preferred solution, in S2, Cu electroplating is performed by completely immersing the steel wire into a $Cu_2P_2O_7$ solution, where the solution contains 25-30 g/l Cu and 150-250 g/l pyrophosphate; and Zn electroplating is performed by completely immersing the steel wire into a $ZnSO_4$ solution, where the solution contains 40-60 g/l Zn.

As a preferred solution, in S2, Cu, Zn, and M electroplating are performed in sequence.

As a preferred solution, in S3, thermal treatment is performed by placing the steel wire into a 500-600° C. muffle furnace for 5-100 seconds.

As a preferred solution, in S3, thermal treatment is performed by placing the steel wire into a 200-450 V intermediate frequency furnace for 5-20 seconds.

As a preferred solution, in S4, drawing is performed by placing the steel wire into a water tank type wire drawing machine for multi-pass drawing.

The present invention also discloses a tire made of said metal wire.

The beneficial effects of the present invention are: the metal wire is good in both initial adhesion and damp heat aging adhesion, and is particularly applicable to a Co-free rubber component because the filament that forms the metal wire is provided with two kinds of alloy coatings at the same time.

DETAILED DESCRIPTION

The present invention is further descried below in combination with the accompanying drawings. The following embodiments are merely used for more clearly describing the technical solutions of the present invention, but are not intended to limit the scope of protection of the present invention.

A filament, where a manufacturing method therefor comprises the following steps:

S1. a steel wire with a specific diameter obtained by steel extension is pretreated by means of thermal treatment and pickling, where physical properties of the steel wire such as mechanical strength are improved after the pretreatment, and impurities on the outer peripheral surface of the steel wire are cleaned to prepare for subsequent treatment.

Figure 1:
FIG. 1 is a schematic distribution diagram of coatings of a filament in one preferred embodiment of the present invention.
Figure 2:
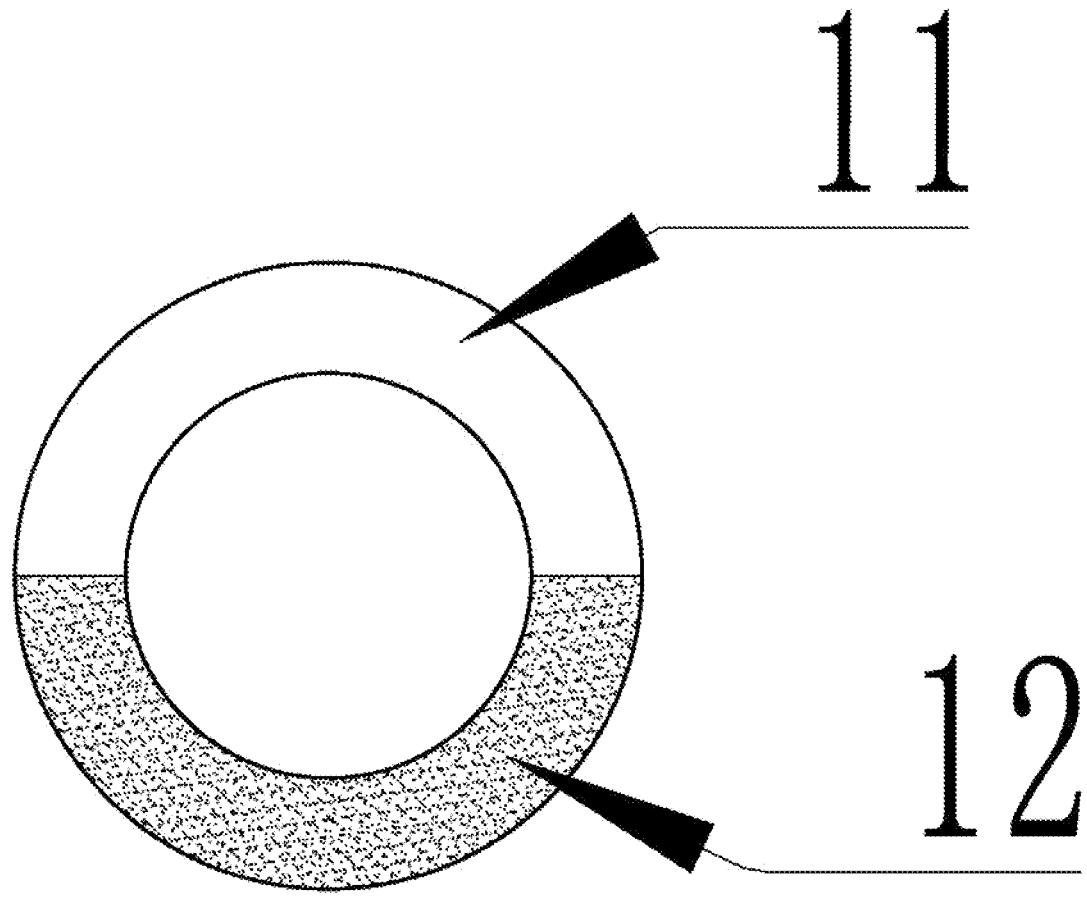
FIG. 2 is an axial section view of the filament shown in FIG. 1.

S2. The steel wire obtained in S1 is immersed into solutions to respectively electroplate Cu, Zn, and M thereon, where metals required for forming a Cu-M-Zn alloy coating and a Cu—Zn alloy coating are covered on the outer peripheral surface of the steel wire in the form of coatings by means of electroplating treatment. Electroplating is performed by three processes:

S21. the steel wire obtained in S1 is completely immersed into a $Cu_2P_2O_7$ solution for Cu electroplating, where the solution contains 25-30 g/l Cu and 150-250 g/l pyrophosphate;

S22. the steel wire obtained in S21 is completely immersed into a $ZnSO_4$ solution for Zn electroplating, where the solution contains 40-60 g/l Zn; and S23. a part of the steel wire obtained in S22 is immersed into an M-containing solution, where the solution contains 30-50 g/l M and an immersion depth of the steel wire in the solution is 5%-95% of the diameter of the steel wire. It should be noted here that distribution forms of alloy coatings with different ratios are obtained by changing the immersion depth of the steel wire in the solution. For example, the distribution form of alloy coatings on the filament as shown in FIGS. 1 and 2 is obtained by setting the immersion depth to be 50% of the diameter of the steel wire during steel wire immersion, and accordingly, the ratios of the two kinds of alloy coatings are both 50%. M is selected from one or two of Co, Ni, Mn, or Mo.

It should be noted that in S2, in order to obtain the steel wire covered with the Cu-M-Zn alloy coating and the Cu—Zn alloy coating, complete immersion plating (Cu electroplating and Zn electroplating) and semi-immersion plating (M electroplating) are used together to generate metal coatings one by one. For example, the steel wire is first completely immersed into a plating solution to generate a fully coated Cu coating, then semi-immersed into a plating solution to generate a non-fully coated M coating, and finally completely immersed into a plating solution to generate a fully coated Zn coating, and subsequently, thermal diffusion treatment is performed to obtain the steel wire with the Cu-M-Zn alloy coating at one side and the Cu—Zn alloy coating at the other side. However, the formula Cu-M-Zn does not limit the position of each metal coating. That is to say, the M coating is not limited between the Cu coating and the Zn coating. In practice, the M coating can be generated before or after the generation of the Cu coating and the Zn coating. In the three processes, i.e., Cu electroplating, Zn electroplating, and M electroplating, the electroplating sequence can be adjusted at will according to actual situations and requirements for the coatings. For example, when a coating of a specific metal is expected to contact the outer peripheral surface of the steel wire, electroplating of the metal should be first performed.

S3. The steel wire obtained in S2 is subjected to thermal treatment to obtain the Cu-M-Zn alloy coating and the Cu—Zn alloy coating by means of thermal diffusion, where the terminal treatment can be performed by placing the steel wire into a 500-600° C. muffle furnace for 5-100 seconds, or can also be performed by placing the steel wire into a 200-450 V intermediate frequency furnace for 5-20 seconds.

S4. The steel wire obtained in S3 is placed into a water tank type wire drawing machine for multi-pass drawing into a filament with a diameter of 0.10-0.80 mm.

The filament obtained in S4 can be made as a metal wire in the present invention by means of a double twisting machine. The inventor finds that when one or more filaments are twisted as a metal wire, the filaments per se that form the metal wire are also twisted so that the Cu-M-Zn alloy coating and the Cu—Zn alloy coating are arranged in a helical and alternate form. Therefore, when the metal wire contacts and adheres to rubber, the two kinds of alloy coatings can provide uniform and good adhesion.

Embodiment 1

Electroplating is performed on a steel wire with a diameter of 1.80 mm to obtain a Cu—Co—Zn alloy coating and a Cu—Zn alloy coating, where the Cu—Co—Zn alloy coating covers 50% of the surface of the 1.80 mm steel wire, and the Cu—Zn alloy coating covers the remaining part; the mass fraction of Cu in the Cu—Co—Zn alloy coating is 67%, the mass fraction of Co is 2%, and the mass fraction of Zn and inevitable impurities is 31%; and the mass fraction of Cu in the Cu—Zn alloy coating is 67%, and the mass fraction of Zn and inevitable impurities is 33%. The mass fraction of Cu in the coatings as a whole is 67%, the mass fraction of Co is 1%, and the mass fraction of Zn and inevitable impurities is 33%.

The 1.80 mm steel wire is drawn as 0.30 mm filaments. As shown in FIGS. 1 and 2, the outer peripheral surface at one side of each filament is covered with the Cu—Zn alloy coating 11, and the outer peripheral surface at the other side of each filament is covered with the Cu—Co—Zn alloy coating 12.

Figure 3:
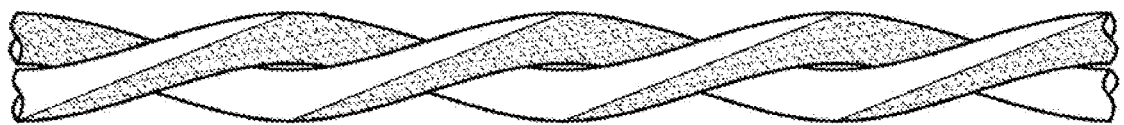
FIG. 3 is a schematic structural diagram of one metal wire in the present invention.

Two 0.30 mm filaments are twisted as a 2×0.30 metal wire by means of a double twisting machine. As shown in FIG. 3, in the metal wire of the specification, the Cu—Co—Zn alloy coating on the outer peripheral surface of one filament and the Cu—Zn alloy coating on the outer peripheral surface of the other filament are located at the same side, and the Cu—Co—Zn alloy coating and the Cu—Zn alloy coating are arranged in a helical and alternate form.

In comparative example 1, the mass fraction of Cu in the coatings as a whole is 67%, and the mass fraction of Zn and inevitable impurities is 33%. In comparative example 2, the mass fraction of Cu in the coatings as a whole is 67%, the mass fraction of Co is 2%, and the mass fraction of Zn and inevitable impurities is 31%.

A comparative test is made between this embodiment and comparative examples of the prior art for the 2×0.30 metal wire with the same structure. See Table 1 for the test result.

TABLE 1

|  | Average Composition of Coatings as a Whole (%) | | | Initial Adhesion | Damp Heat Aging Adhesion |
|---|---|---|---|---|---|
|  | Cu | Zn | Co | (N) | (N) |
| Comparative Example 1 | 67 | 33 | / | 415 | 320 |
| Comparative Example 2 | 67 | 31 | 2 | 355 | 400 |

TABLE 1-continued

|  | Average Composition of Coatings as a Whole (%) | | | Initial Adhesion (N) | Damp Heat Aging Adhesion (N) |
| --- | --- | --- | --- | --- | --- |
|  | Cu | Zn | Co |  |  |
| Embodiment 1 | 67 | 32 | 1 | 410 | 400 |

It can be seen from Table 1 that compared with comparative example 1 of the Cu—Zn alloy coating containing no Co, the initial adhesion of the metal wire in this embodiment does not decrease significantly and the damp heat aging adhesion increases by 25%. Compared with comparative example 2 covering two kinds of alloy coatings of Cu, Co, and Zn, the initial adhesion of the metal wire in this embodiment increases by 15.5%, and the damp heat aging adhesion does not decrease significantly. Particularly, the amount of Co decreases by 50%, which can significantly reduce the manufacturing costs.

Embodiment 2

Figure 4:
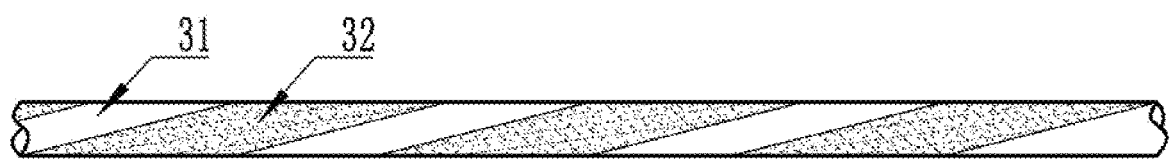
FIG. 4 is a schematic structural diagram of another metal wire in the present invention.

Different from Embodiment 1, in this embodiment, the metal wire refers to a 1×0.40 ST metal wire made by twisting a single filament, and the diameter of the filament is 0.40 mm. As shown in FIG. 4, after twisting, a Cu—Co—Zn alloy coating 32 and a Cu—Zn alloy coating 31 are arranged in a helical and alternate form. The Cu—Co—Zn alloy coating covers 60% of the outer peripheral surface of the filament, and the Cu—Zn alloy coating covers the remaining part; the mass fraction of Cu in the Cu—Co—Zn alloy coating is 63%, the mass fraction of Co is 4%, and the mass fraction of Zn and inevitable impurities is 33%; and the mass fraction of Cu in the Cu—Zn alloy coating is 63%, and the mass fraction of Zn and inevitable impurities is 37%. The mass fraction of Cu in the coatings as a whole is 63%, the mass fraction of Co is 2.4%, and the mass fraction of Zn and inevitable impurities is 34.6%.

In comparative example 3, the mass fraction of Cu in the coatings as a whole is 63%, and the mass fraction of Zn and inevitable impurities is 37%. In comparative example 4, the mass fraction of Cu in the coatings as a whole is 63%, the mass fraction of Co is 4%, and the mass fraction of Zn and inevitable impurities is 33%.

A comparative test is made between this embodiment and comparative examples of the prior art for the 1×0.40 metal wire of the same structure. See Table 2 for the test result.

TABLE 2

|  | Average Composition of Coatings as a Whole (%) | | | Initial Adhesion (N) | Damp Heat Aging Adhesion (N) |
| --- | --- | --- | --- | --- | --- |
|  | Cu | Zn | Co |  |  |
| Comparative Example 3 | 63 | 37 | / | 135 | 98 |
| Comparative Example 4 | 63 | 33 | 4 | 105 | 130 |
| Embodiment 2 | 63 | 34.6 | 2.4 | 130 | 125 |

It can be seen from Table 2 that compared with comparative example 3 of the Cu—Zn alloy coating containing no Co, the initial adhesion of the metal wire in this embodiment does not decrease significantly and the damp heat aging adhesion increases by 27.6%. Compared with comparative example 4 covering two kinds of alloy coatings of Cu, Co, and Zn, the initial adhesion of the metal wire in this embodiment increases by 23.81%, and the damp heat aging adhesion does not decrease significantly. Particularly, the amount of Co decreases by 40%, which can significantly reduce the manufacturing costs.

Embodiment 3

Different from Embodiment 1, in this embodiment, the metal wire refers to a 3×0.30 ST metal wire made by twisting a single filament, and the diameter of the filament is 0.30 mm. The mass fraction of Cu in a Cu—Co—Zn alloy coating is 58%, the mass fraction of Co is 4%, and the mass fraction of Zn and inevitable impurities is 38%; the mass fraction of Cu in a Cu—Zn alloy coating is 58%, and the mass fraction of Zn and inevitable impurities is 42%. The mass fraction of Cu in the coatings as a whole is 58%, the mass fraction of Co is 2%, and the mass fraction of Zn and inevitable impurities is 40%.

In comparative example 5, the mass fraction of Cu in the coatings as a whole is 63.5%, and the mass fraction of Zn and inevitable impurities is 36.5%. In comparative example 6, the mass fraction of Cu in the coatings as a whole is 65%, the mass fraction of Co is 4%, and the mass fraction of Zn and inevitable impurities is 31%.

A comparative test is made between this embodiment and comparative examples 5 and 6 of the prior art for the 3×0.30 metal wire of the same structure. See Table 3 for the test result.

The initial adhesion is evaluated based on initial adhesion rubber attachment performance. That is, place the metal wire in rubber, carry out vulcanization treatment at a temperature of about 150° C. for 30 munities, cool at room temperature for 3 hours, and then peel off the metal wire from the rubber, so that the adhesion rubber attachment performance is evaluated in 10 grades according to the state of rubber attached on the metal wire. The higher the evaluation grade, the better the adhesion between the metal wire and the rubber.

The damp heat aging adhesion is evaluated based on damp heat aging adhesion rubber attachment performance. That is, place the metal wire in rubber, carry out vulcanization treatment at a temperature of about 150° C. for 30 munities, further keep in a 70° C. and 96% rh high-temperature high-humidity state for 14 days, and then peel off the metal wire from the rubber, so that the adhesion rubber attachment performance is evaluated in 10 grades according to the state of rubber attached on the metal wire. The higher the evaluation grade, the better the adhesion between the metal wire and the rubber.

TABLE 3

|  | Average Composition of Coatings as a Whole (wt %) | | | Adhesion Rubber Attachment Performance Grade(the higher the grade, the better the performance) | |
| --- | --- | --- | --- | --- | --- |
|  | Cu | Zn | M | Initial Adhesion | Damp Heat Aging Adhesion |
| Comparative Example 5 | 63.5 | 36.5 | / | 7 | 6 |
| Comparative Example 6 | 65 | 31 | 4(Co) | 6 | 7 |

TABLE 3-continued

| | Average Composition of Coatings as a Whole (wt %) | | | Adhesion Rubber Attachment Performance Grade (the higher the grade, the better the performance) | |
|---|---|---|---|---|---|
| | Cu | Zn | M | Initial Adhesion | Damp Heat Aging Adhesion |
| Embodiment 3 | 58 | 40 | 2(Co) | 7 | 7 |
| Embodiment 4 | 61 | 37 | 2(Co) | 7 | 8 |
| Embodiment 5 | 65 | 33 | 2(Co) | 8 | 8 |
| Embodiment 6 | 68 | 30 | 2(Co) | 8 | 8 |
| Embodiment 7 | 72 | 26 | 2(Co) | 8 | 7 |
| Embodiment 8 | 65 | 34.75 | 0.25(Co) | 7 | 7 |
| Embodiment 9 | 65 | 34 | 1(Co) | 8 | 8 |
| Embodiment 10 | 65 | 33 | 2(Co) | 8 | 8 |
| Embodiment 11 | 65 | 32.5 | 2.5(Co) | 7 | 8 |
| Embodiment 12 | 65 | 33 | 2(Ni) | 8 | 8 |
| Embodiment 13 | 65 | 33 | 2(Mn) | 7 | 7 |
| Embodiment 14 | 65 | 33 | 2(Mo) | 7 | 7 |
| Embodiment 15 | 65 | 34 | 1(Co + Ni) | 8 | 8 |
| Embodiment 16 | 65 | 33.5 | 1.5(Co + Ni) | 8 | 8 |
| Embodiment 17 | 65 | 33 | 2(Co + Ni) | 8 | 8 |
| Embodiment 18 | 65 | 34.6 | 0.4(Co) | 8 | 7 |
| Embodiment 19 | 65 | 33.4 | 1.6(Co) | 8 | 8 |
| Embodiment 20 | 65 | 32.6 | 2.4(Co) | 8 | 8 |
| Embodiment 21 | 65 | 31.4 | 3.6(Co) | 7 | 8 |

It can be seen from Table 3 that compared with comparative example 5 of the Cu—Zn alloy coating containing no Co, there is no significant difference in the initial adhesion of the metal wire in this embodiment, but the damp heat aging adhesion is improved by one grade. Compared with comparative example 6 covering two kinds of alloy coatings of Cu, Co, and Zn, the initial adhesion of the metal wire in this embodiment is improved by one grade, and there is no significant difference in the damp heat aging adhesion. Particularly, the amount of Co decreases by 50%, which can significantly reduce the manufacturing costs.

Embodiment 4

Different from Embodiment 3, in this embodiment, the mass fraction of Cu in a Cu—Co—Zn alloy coating is 61%, the mass fraction of Co is 4%, and the mass fraction of Zn and inevitable impurities is 35%; the mass fraction of Cu in a Cu—Zn alloy coating is 61%, and the mass fraction of Zn and inevitable impurities is 39%. The mass fraction of Cu in the coatings as a whole is 61%, the mass fraction of Co is 2%, and the mass fraction of Zn and inevitable impurities is 37%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, there is no significant difference in the initial adhesion of the metal wire in this embodiment, but the damp heat aging adhesion is improved by two grades. Compared with comparative example 6 covering two kinds of alloy coatings of Cu, Co, and Zn, the initial adhesion of the metal wire in this embodiment is improved by one grade, and the damp heat aging adhesion is also improved by one grade. Particularly, the amount of Co decreases by 50%, which can significantly reduce the manufacturing costs.

Embodiment 5

Different from Embodiment 3, in this embodiment, the mass fraction of Cu in a Cu—Co—Zn alloy coating is 65%, the mass fraction of Co is 4%, and the mass fraction of Zn and inevitable impurities is 31%; the mass fraction of Cu in a Cu—Zn alloy coating is 65%, and the mass fraction of Zn and inevitable impurities is 35%. The mass fraction of Cu in the coatings as a whole is 65%, the mass fraction of Co is 2%, and the mass fraction of Zn and inevitable impurities is 33%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases by 50%, which can significantly reduce the manufacturing costs.

Embodiment 6

Different from Embodiment 3, in this embodiment, the mass fraction of Cu in a Cu—Co—Zn alloy coating is 68%, the mass fraction of Co is 4%, and the mass fraction of Zn and inevitable impurities is 28%; the mass fraction of Cu in a Cu—Zn alloy coating is 68%, and the mass fraction of Zn and inevitable impurities is 32%. The mass fraction of Cu in the coatings as a whole is 68%, the mass fraction of Co is 2%, and the mass fraction of Zn and inevitable impurities is 30%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by one grade, and the damp heat aging adhesion is also improved by one grade. Particularly, the amount of Co decreases by 50%, which can significantly reduce the manufacturing costs.

Embodiment 7

Different from Embodiment 3, in this embodiment, the mass fraction of Cu in a Cu—Co—Zn alloy coating is 72%, the mass fraction of Co is 4%, and the mass fraction of Zn and inevitable impurities is 24%; the mass fraction of Cu in a Cu—Zn alloy coating is 72%, and the mass fraction of Zn and inevitable impurities is 28%. The mass fraction of Cu in the coatings as a whole is 72%, the mass fraction of Co is 2%, and the mass fraction of Zn and inevitable impurities is 26%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by one grade. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases by 50%, which can significantly reduce the manufacturing costs.

Embodiment 8

Different from Embodiment 3, in this embodiment, the mass fraction of Cu in a Cu—Co—Zn alloy coating is 65%, the mass fraction of Co is 0.5%, and the mass fraction of Zn and inevitable impurities is 34.5%; the mass fraction of Cu in a Cu—Zn alloy coating is 65%, and the mass fraction of Zn and inevitable impurities is 35%. The mass fraction of Cu in the coatings as a whole is 65%, the mass fraction of Co is 0.25%, and the mass fraction of Zn and inevitable impurities is 34.75%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, there is no significant difference in the initial adhesion of the metal wire in this embodiment, but the damp heat aging adhesion is improved by one grade. Compared with comparative example 6 covering two kinds of alloy coatings of Cu, Co, and Zn, there is no significant difference in the initial adhesion of the metal wire in this embodiment, but the damp heat aging adhesion is improved by one grade. Particularly, the amount of Co decreases by 93.75%, which can significantly reduce the manufacturing costs.

Embodiment 9

Different from Embodiment 3, in this embodiment, the mass fraction of Cu in a Cu—Co—Zn alloy coating is 65%, the mass fraction of Co is 2%, and the mass fraction of Zn and inevitable impurities is 33%; the mass fraction of Cu in a Cu—Zn alloy coating is 65%, and the mass fraction of Zn and inevitable impurities is 35%. The mass fraction of Cu in the coatings as a whole is 65%, the mass fraction of Co is 1%, and the mass fraction of Zn and inevitable impurities is 34%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases by 75%, which can significantly reduce the manufacturing costs.

Embodiment 10

Different from Embodiment 3, in this embodiment, the mass fraction of Cu in a Cu—Co—Zn alloy coating is 65%, the mass fraction of Co is 4%, and the mass fraction of Zn and inevitable impurities is 31%; the mass fraction of Cu in a Cu—Zn alloy coating is 65%, and the mass fraction of Zn and inevitable impurities is 35%. The mass fraction of Cu in the coatings as a whole is 65%, the mass fraction of Co is 2%, and the mass fraction of Zn and inevitable impurities is 33%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases by 50%, which can significantly reduce the manufacturing costs.

Embodiment 11

Different from Embodiment 3, in this embodiment, the mass fraction of Cu in a Cu—Co—Zn alloy coating is 65%, the mass fraction of Co is 5%, and the mass fraction of Zn and inevitable impurities is 30%; the mass fraction of Cu in a Cu—Zn alloy coating is 65%, and the mass fraction of Zn and inevitable impurities is 35%. The mass fraction of Cu in the coatings as a whole is 65%, the mass fraction of Co is 2.5%, and the mass fraction of Zn and inevitable impurities is 32.5%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, there is no significant difference in the initial adhesion of the metal wire in this embodiment, but the damp heat aging adhesion is improved by two grades. Compared with comparative example 6 covering two kinds of alloy coatings of Cu, Co, and Zn, the initial adhesion of the metal wire in this embodiment is improved by one grade, and the damp heat aging adhesion is also improved by one grade. Particularly, the amount of Co decreases by 37.5%, which can significantly reduce the manufacturing costs.

Embodiment 12

Different from Embodiment 3, in this embodiment, coatings comprise a Cu—Ni—Zn alloy coating and a Cu—Zn alloy coating. The mass fraction of Cu in the Cu—Ni—Zn alloy coating is 65%, the mass fraction of Ni is 4%, and the mass fraction of Zn and inevitable impurities is 31%; the mass fraction of Cu in the Cu—Zn alloy coating is 65%, and the mass fraction of Zn and inevitable impurities is 35%. The mass fraction of Cu in the coatings as a whole is 65%, the mass fraction of Ni is 2%, and the mass fraction of Zn and inevitable impurities is 33%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, Co is replaced by Ni, which can significantly reduce the manufacturing costs.

Embodiment 13

Different from Embodiment 3, in this embodiment, coatings comprise a Cu—Mn—Zn alloy coating and a Cu—Zn alloy coating. The mass fraction of Cu in the Cu—Mn—Zn alloy coating is 65%, the mass fraction of Mn is 4%, and the mass fraction of Zn and inevitable impurities is 31%; the mass fraction of Cu in the Cu—Zn alloy coating is 65%, and the mass fraction of Zn and inevitable impurities is 35%. The mass fraction of Cu in the coatings as a whole is 65%, the mass fraction of Mn is 2%, and the mass fraction of Zn and inevitable impurities is 33%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, there is no significant difference in the initial adhesion of the metal wire in this embodiment, but the damp heat aging adhesion is improved by one grade. Compared with comparative example 6 covering two kinds of alloy coatings of Cu, Co, and Zn, the initial adhesion of the metal wire in this embodiment is improved by one grade, but there is no significant difference in the damp heat aging adhesion. Particularly, Co is replaced by Mn, which can significantly reduce the manufacturing costs.

Embodiment 14

Different from Embodiment 3, in this embodiment, coatings comprise a Cu—Mo—Zn alloy coating and a Cu—Zn alloy coating. The mass fraction of Cu in the Cu—Mo—Zn alloy coating is 65%, the mass fraction of Mo is 4%, and the mass fraction of Zn and inevitable impurities is 31%; the mass fraction of Cu in the Cu—Zn alloy coating is 65%, and the mass fraction of Zn and inevitable impurities is 35%. The mass fraction of Cu in the coatings as a whole is 65%, the mass fraction of Mo is 2%, and the mass fraction of Zn and inevitable impurities is 33%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, there is no significant difference in the initial adhesion of the metal wire in this embodiment, but the damp heat aging adhesion is improved by one grade. Compared with comparative example 6 covering two kinds of alloy coatings of Cu, Co, and Zn, the initial adhesion of the metal wire in this embodiment is improved by one grade, but there is no significant difference in the damp heat aging adhesion. Particularly, Co is replaced by Mo, which can significantly reduce the manufacturing costs.

Embodiment 15

Different from Embodiment 3, in this embodiment, coatings comprise a Cu—Co—Ni—Zn alloy coating and a Cu—Zn alloy coating. The mass fraction of Cu in the Cu—Co—Ni—Zn alloy coating is 65%, the mass fraction of Co and Ni is 2%, and the mass fraction of Zn and inevitable impurities is 33%; the mass fraction of Cu in the Cu—Zn alloy coating is 65%, and the mass fraction of Zn and inevitable impurities is 35%. The mass fraction of Cu in the coatings as a whole is 65%, the mass fraction of Co and Ni is 1%, and the mass fraction of Zn and inevitable impurities is 34%.

Different from Embodiment 3, in this embodiment, coatings comprise a Cu—Co—Ni—Zn alloy coating and a Cu—Zn alloy coating. The mass fraction of Cu in the Cu—Co—Ni—Zn alloy coating is 65%, the mass fraction of Co and Ni is 2%, and the mass fraction of Zn and inevitable impurities is 33%; the mass fraction of Cu in the Cu—Zn alloy coating is 65%, and the mass fraction of Zn and inevitable impurities is 35%. The mass fraction of Cu in the coatings as a whole is 65%, the mass fraction of Co and Ni is 1%, and the mass fraction of Zn and inevitable impurities is 34%.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases significantly and a part of Co is replaced by Ni, which can significantly reduce the manufacturing costs.

Embodiment 16

Different from Embodiment 15, in this embodiment, the mass fraction of Cu in a Cu—Co—Ni—Zn alloy coating is 65%, the mass fraction of Co and Ni is 3%, and the mass fraction of Zn and inevitable impurities is 32%; the mass fraction of Cu in a Cu—Zn alloy coating is 65%, and the mass fraction of Zn and inevitable impurities is 35%. The mass fraction of Cu in the coatings as a whole is 65%, the mass fraction of Co and Ni is 1.5%, and the mass, fraction of Zn and inevitable impurities is 33.5%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases significantly and a part of Co is replaced by Ni, which can significantly reduce the manufacturing costs.

Embodiment 17

Different from Embodiment 15, in this embodiment, the mass fraction of Cu in a Cu—Co—Ni—Zn alloy coating is 65%, the mass fraction of Co and Ni is 4%, and the mass fraction of Zn and inevitable impurities is 31%; the mass fraction of Cu in a Cu—Zn alloy coating is 65%, and the mass fraction of Zn and inevitable impurities is 35%. The mass fraction of Cu in the coatings as a whole is 65%, the mass fraction of Co and Ni is 2%, and the mass fraction of Zn and inevitable impurities is 33%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases significantly and a part of Co is replaced by Ni, which can significantly reduce the manufacturing costs.

Embodiment 18

Different from Embodiment 3, in this embodiment, a Cu—Co—Zn alloy coating covers 10% of the outer peripheral surface of a filament, and a Cu—Zn alloy coating covers the remaining part; the mass fraction of Cu in the Cu—Co—Zn alloy coating is 65%, the mass fraction of Co is 4%, and the mass fraction of Zn and inevitable impurities is 31%; the mass fraction of Cu in the Cu—Zn alloy coating is 65%, and the mass fraction of Zn and inevitable impurities is 35%. The mass fraction of Cu in the coatings as a whole is 65%, the mass fraction of Co is 0.4%, and the mass fraction of Zn and inevitable impurities is 34.6%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is also improved by one grade. Compared with comparative example 6 covering two kinds of alloy coatings of Cu, Co, and Zn, the initial adhesion of the metal wire in this embodiment is improved by two grades, and there is no significant difference in the damp heat aging adhesion. Particularly, the amount of Co decreases by 90%, which can significantly reduce the manufacturing costs.

Embodiment 19

Different from Embodiment 18, in this embodiment, a Cu—Co—Zn alloy coating covers 40% of the outer peripheral surface of a filament, and a Cu—Zn alloy coating covers the remaining part. The mass fraction of Cu in the coatings as a whole is 65%, the mass fraction of Co is 1.6%, and the mass fraction of Zn and inevitable impurities is 33.4%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases by 60%, which can significantly reduce the manufacturing costs.

Embodiment 20

Different from Embodiment 18, in this embodiment, a Cu—Co—Zn alloy coating covers 60% of the outer peripheral surface of a filament, and a Cu—Zn alloy coating covers the remaining part. The mass fraction of Cu in the coatings as a whole is 65%, the mass fraction of Co is 2.4%, and the mass fraction of Zn and inevitable impurities is 32.6%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, the initial adhesion of the metal wire in this embodiment is improved by one grade, and the damp heat aging adhesion is improved by two grades. Compared with comparative example 6 covering two kinds of alloy coatings of Cu, Co, and Zn, the initial adhesion of the metal wire in this embodiment is improved by two grades, and the damp heat aging adhesion is improved by one grade. Particularly, the amount of Co decreases by 40%, which can significantly reduce the manufacturing costs.

Embodiment 21

Different from Embodiment 18, in this embodiment, a Cu—Co—Zn alloy coating covers 90% of the outer peripheral surface of a filament, and a Cu—Zn alloy coating covers the remaining part. The mass fraction of Cu in the coatings as a whole is 65%, the mass fraction of Co is 3.6%, and the mass fraction of Zn and inevitable impurities is 31.4%.

A comparative test is made between this embodiment and comparative examples 5 and 6 of the prior art for a metal wire of the same specification. See Table 3 for the test result.

It can be seen from Table 3 that compared with comparative example 5 of the Cu—Zn alloy coating containing no Co, there is no significant difference in the initial adhesion of the metal wire in this embodiment, but the damp heat aging adhesion is improved by two grades. Compared with comparative example 6 covering two kinds of alloy coatings of Cu, Co, and Zn, the initial adhesion of the metal wire in this embodiment is improved by one grade, and the damp heat aging adhesion is also improved by one grade. Particularly, the amount of Co decreases by 10%, which can significantly reduce the manufacturing costs.

The above are only preferred embodiments of the present invention. It should be noted that many modifications and variations can be made thereto for a person skilled in the art without departing from the technical principle of the present invention, and those modifications and variations should also be regarded as falling within the scope of protection of the present invention.

What is claimed is:

1. A metal wire, made by twisting at least one filament, an outer peripheral surface of the filament being covered with a Cu-M-Zn alloy coating, wherein
    the outer peripheral surface of the filament is also covered with a Cu—Zn alloy coating; the Cu-M-Zn alloy coating and the Cu—Zn alloy coating are arranged in a helical and alternate form an area covered by the Cu-M-Zn alloy coating is 10%~90% of an area of the outer peripheral surface of the filament, and the rest is the Cu—Zn alloy coating; M in the Cu-M-Zn alloy coating is selected from one or two of Co, Ni, Mn, or Mo; and
    a mass fraction of Cu in the Cu-M-Zn alloy coating is 58%~72%, a mass fraction of M in the Cu-M-Zn alloy coating is 0.5%~5%, and a balance in the Cu-M-Zn alloy coating is Zn and inevitable impurities.

2. The metal wire according to claim 1, wherein, the area covered by the Cu-M-Zn alloy coating is 40%~60% of the area of the outer peripheral surface of the filament.

3. The metal wire according to claim 2, wherein, a diameter of the filament is 0.10~0.80 mm.

4. The metal wire according to claim 1, wherein, a diameter of the filament is 0.10~80 mm.

5. A tire, comprising a metal wire according to claim 1.

6. A manufacturing method for the metal wire according to claim 1, comprising the following steps:
    S1, pretreating a steel wire;
    S2, immersing the steel wire obtained in S1 into solutions to respectively electroplate Cu, Zn, and M thereon;
    S3, thermally treating the steel wire obtained in S2 to obtain a Cu-M-Zn alloy coating and a Cu—Zn alloy coating by means of thermal diffusion;
    S4, drawing the steel wire obtained in S3 into a filament; and
    S5, twisting at least one filament obtained in S4 to obtain the metal wire;
    wherein in S2, M electroplating is performed by immersing a part of the steel wire into an M-containing solution, the M-containing solution contains 30~50 g/l M, and an immersion depth of the steel wire in the M-containing solution is 5%~95% of a diameter of the steel wire.

7. The manufacturing method according to claim 6, wherein,
    in S2, Cu electroplating is performed by completely immersing the steel wire into a $Cu_2P_2O_7$ solution, wherein the $Cu_2P_2O_7$ solution contains 25~30 g/l Cu and 150~250 g/l pyrophosphate; and
    Zn electroplating is performed by completely immersing the steel wire into a $ZnSO_4$ solution, wherein the $ZnSO_4$ solution contains 40~60 g/l Zn.

8. The manufacturing method according to claim 6, wherein,
    in S2, Cu, Zn, and M electroplating are performed in sequence.

9. The manufacturing method according to claim 6, wherein,
    in S3, thermal treatment is performed by placing the steel wire into a 500~600° C. muffle furnace for 5~100 seconds.

10. The manufacturing method according to claim 6, wherein,
    in S3, thermal treatment is performed by placing the steel wire into a 200~450 V intermediate frequency furnace for 5~20 seconds.

11. The manufacturing method according to claim 6, wherein,
    in S4, drawing is performed by placing the steel wire into a water tank type wire drawing machine for multi-pass drawing.

* * * * *